(12) United States Patent
Waters et al.

(10) Patent No.: US 7,646,303 B2
(45) Date of Patent: Jan. 12, 2010

(54) DETECTOR

(75) Inventors: John Deryk Waters, Combe Down Bath (GB); Weng Wah Loh, Filton Bristol (GB); Fraser John Dickin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 11/598,195

(22) Filed: Nov. 13, 2006

(65) Prior Publication Data
US 2007/0103307 A1 May 10, 2007

Related U.S. Application Data

(63) Continuation of application No. 10/697,269, filed on Oct. 31, 2003, now Pat. No. 7,212,123.

(51) Int. Cl.
*H03H 7/01* (2006.01)

(52) U.S. Cl. .............. 340/572.5; 340/572.1; 340/686.1; 340/10.34; 342/42; 342/20; 358/1.15; 358/1.8; 700/56

(58) Field of Classification Search ............. 340/572.1, 340/572.5, 572.2, 686.1, 10.1, 10.34; 342/42, 342/20; 347/20; 358/1.15, 1.8; 700/56
See application file for complete search history.

(56) References Cited

U.S. PATENT DOCUMENTS

| | | | |
|---|---|---|---|
| 5,594,448 A | 1/1997 | D'Hont | |
| 6,208,235 B1 | 3/2001 | Trontelj | |
| 6,280,544 B1 | 8/2001 | Fox et al. | |
| 6,353,393 B1 | 3/2002 | Nylander | |
| 6,420,961 B1 | 7/2002 | Bates et al. | |
| 6,527,356 B1 | 3/2003 | Spurr et al. | |
| 6,559,756 B2 | 5/2003 | Al-Araji et al. | |
| 6,622,567 B1 | 9/2003 | Hamel et al. | |
| 6,710,891 B1 | 3/2004 | Vraa et al. | |
| 6,812,824 B1 * | 11/2004 | Goldinger et al. | 340/10.1 |
| 6,837,427 B2 | 1/2005 | Overhultz et al. | |
| 6,929,793 B2 * | 8/2005 | Spivey-Krobath et al. | 424/93.4 |
| 2002/0170973 A1 | 11/2002 | Teraura | |

FOREIGN PATENT DOCUMENTS

| | | |
|---|---|---|
| EP | 0 391 559 | 10/1990 |
| EP | 1 076 316 | 2/2001 |
| GB | 2 333 665 | 7/1999 |
| WO | WO-93/06433 | 4/1993 |

OTHER PUBLICATIONS

Finkenzeller, "RFID Handbook: Grundlagen Und Praktische Anwendungen Induktiyer Funkanlagen, Tranponder Und Kontaktloser Chipkarten," Carl Hanser Verlag, Sep. 26, 2002, pp. 267-271.

* cited by examiner

*Primary Examiner*—Davetta W Goins

(57) ABSTRACT

A detector for detecting the presence of a memory tag, the detector comprising a radio frequency source operable to generate a radio frequency signal and a detector resonant circuit part connected to the radio frequency source, the detector resonant circuit part comprising an antenna, the detector further comprising a power monitor responsive to the power of a reflected signal returned from the detector resonant circuit part, the power monitor being operable to generate an output in response to the power of the reflected signal, wherein a decrease in the power of the reflected signal indicates the presence of a tag in the vicinity of the antenna.

3 Claims, 7 Drawing Sheets

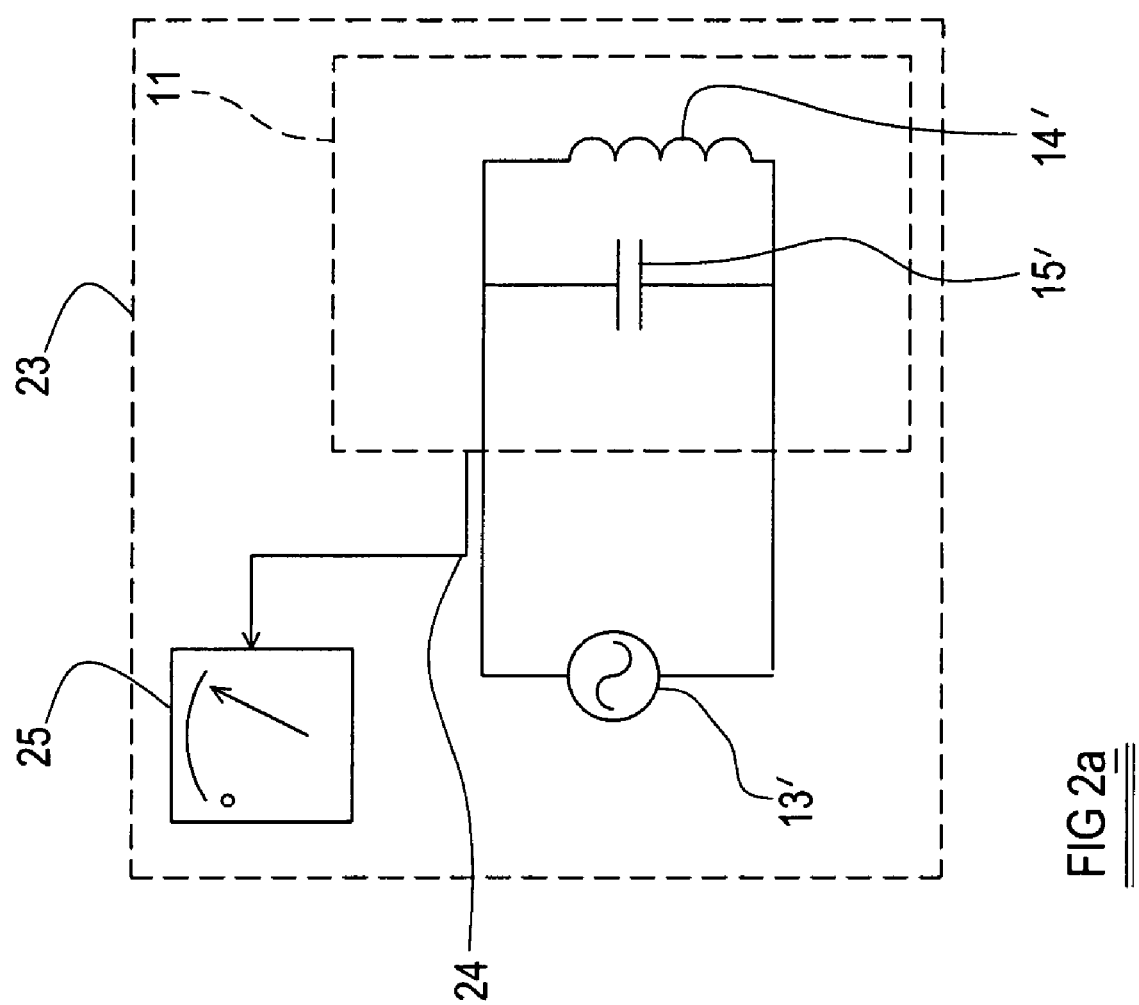

DETECTOR

This application is a Continuation of U.S. Ser. No. 10/697,269 filed on Oct. 31, 2003, which claims priority from Great Britain patent application 0227196.3, filed on Nov. 21, 2002. The entire content of the aforementioned applications are incorporated herein by reference

FIELD OF THE INVENTION

This invention relates to a detector for detecting the presence of a memory tag, a read/write device, a read/write system and a method of detecting the presence of a memory tag.

BACKGROUND OF THE INVENTION

Memory tags in the form of Radio Frequency Identification (RFID) tags are well known in the prior art, and the technology is well established (see for example: RFID Handbook, Klaus Finkenzeller, 1999, John Wiley & Sons). RFID tags come in many forms but all comprise an integrated circuit with information stored on it and a coil which enables it to be interrogated by a read/write device generally referred to as a reader. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. In addition Hitachi has developed a memory tag referred to as a "mu-chip" which is a chip of 0.4 mm square and operates at 2.45 GHz. These smaller memory tags can be used in a variety of different applications. Some are even available for the tagging of pets by implantation.

Although it is known to provide tags with their own power source, in many applications the tag is also powered by the radio frequency signal generated by the reader. Such a known system is shown in FIG. 1 where a reader is indicated generally at 10 and a tag at 12. The reader 10 comprises a radio frequency signal generator 13 and a resonant circuit part 11, in the present example comprising an inductor 14 and a capacitor 15 connected in parallel. The inductor 14 comprises a antenna. The resonant circuit part will have a particular resonant frequency in accordance with the capacitance and inductance of the capacitor 15 and the inductor 14, and the frequency signal generator 13 is operated to generate a signal at that resonant frequency.

The tag 12 similarly comprises a resonant circuit part generally illustrated at 16, a rectifying circuit part generally indicated at 17 and a memory 18. The resonant circuit part 16 comprises an inductor 19 which again comprises in this example a loop antenna, and a capacitor 20. The resonant circuit part 16 will thus have a resonant frequency set by the inductor 19 and capacitor 20. The resonant frequency of the resonant circuit part 16 is selected to be the same as that of the reader 10. The rectifying part comprises a forward-biased diode 21 and a capacitor 22 and thus effectively acts as a half-ware rectifier.

When the reader 10 is brought sufficiently close to the tag 12, a signal generated by the frequency generator 13 will cause the resonant circuit part 11 to generate a high frequency electromagnetic field. When the resonant circuit part 16 is moved within this field, a current will be caused to flow in the resonant circuit part 16, drawing power from the time varying magnetic field generated by the reader. The rectifying circuit part 17 will then serve to smooth the voltage across the resonant frequency part and provide a power supply storage. The rectifying circuit part 17 is sufficient to supply a sufficiently stable voltage to the memory 18 for the memory to operate.

There are many uses to which such memory tags may be put. For example in EP 1 076 316 A2 an application is described whereby a memory tag is attached to a print of a photograph and contains data about the print concerned.

For some uses the RFID tags are attached to the rear of sticky labels, which may be printed on the front with data, such as for example a bar code, or other product identifiers. Apparatus for applying RFID tags to the rear of labels is described in U.S. Pat. No. 6,280,544 B1, where the front of the labels are printed and then the tags are applied to the rear. The apparatus further includes a read station down stream of the tag being applied to the rear of the label, where the operation of the tag is checked before the label is dispensed from the apparatus for use.

In such prior applications, the tag is easy to locate with a read/write device since the tag itself is physically large enough to be found, and/or is in a constant position, for example when applied to a label, and in many cases the range of the read/write head is sufficiently large, for example tens of centimeters at least. Where the tag is miniaturized and of comparatively low power however, a problem then arises in locating a read/write device sufficiently close to the tag for reading and/or writing of data to or from the tag to occur. An aim of the invention is to reduce or overcome the above problem.

SUMMARY OF THE INVENTION

According to one aspect of the invention, we provide a detector for detecting the presence of a memory tag, the detector comprising a radio frequency source operable to generate a radio frequency signal and a detector resonant circuit part connected to the radio frequency source, the detector resonant circuit part comprising an antenna, the detector further comprising a power monitor responsive to the power of a reflected signal returned from the detector resonant circuit part, the power monitor being operable to generate an output in response to the power of the reflected signal, wherein a decrease in the power of the reflected signal indicates the presence of a tag in the vicinity of the antenna.

The power monitor may be operable to generate an output when the power level falls below a threshold.

The power monitor may be operable to generate an output indicating the power of the reflected signal.

The position processor may be operable to receive position information indicating the position of the detector and an output from the power monitor, the position monitor being operable to store position information relating to at least one position and the power monitor output at that position, and generate a recommended position output depending on the store position information and power monitor output information.

According to a second aspect of the invention, we provide a read/write device for reading and/or writing data to a tag, the read/write device comprising a detector according to any one of claims 1 to 4, the read/write device being operable to read data from and/or write data to the tag in response to the power monitor output.

The read/write system may comprise a detector and a movable head may be provided with the antenna, the read/write system may be operable to move the movable head and generate position information corresponding to the position of the movable head, the read/write system further may be operable to transmit the position information to the detector, receive a recommended position output from the detector and move the movable head to a position indicated by the recommended position output.

The read/write system may be operable to read data from and/or write data to the tag when the movable head is at the position indicated by the recommended position information.

The read/write system may comprise a printer, wherein the movable head may comprise a print head and wherein the printer is operable to print on a base medium provided with at least one tag.

According to a third aspect of the invention we provide a printer operable to print on a base medium provided with at least one tag, the printer comprising a detector for detecting the presence of a memory tag, the detector comprising a radio frequency source operable to generate a radio frequency signal and a detector resonant circuit part connected to the radio frequency source, the detector resonant circuit part comprising an antenna, the detector further comprising a power monitor responsive to the power of a reflected signal returned from the detector resonant circuit part, the power monitor being operable to generate an output in response to the power of the reflected signal, wherein a decrease in the power of the reflected signal indicates the presence of a tag in the vicinity of the antenna.

The printer may be operable to read data from and/or write data to the tag in response to the power monitor output.

The printer may have a movable print head, where the print head may be provided with the antenna, the printer being operable to move the movable head and generate position information corresponding to the position of the movable head, the printer further being operable to transmit the position information to the detector, receive a recommended position output from the detector and move the movable head to a position indicated by the recommended position output.

According to a fourth aspect of the invention, we provide a method for detecting the presence of a tag, comprising transmitting a signal to a resonant circuit part comprising an antenna, monitoring the power of a reflected signal reflected from the resonant circuit part, wherein a decrease in the power of the reflected signal indicates the presence of a tag in the vicinity of the antenna.

The method may comprise the step of moving a detector provided with the antenna relative to the tag, storing position information relating to the position of the detector and power information related to the power reflected signal at that position, and generating a recommended position in accordance with store information.

BRIEF DESCRIPTION OF THE DRAWINGS

An embodiment of the present invention will now be described by way of example only with reference to the accompanying drawings wherein;

FIG. 2a is a diagrammatic illustration of a read/write device embodying the present invention in the absence of a tag.

DETAILED DESCRIPTION OF THE PREFERRED EMBODIMENTS

Figure 1:
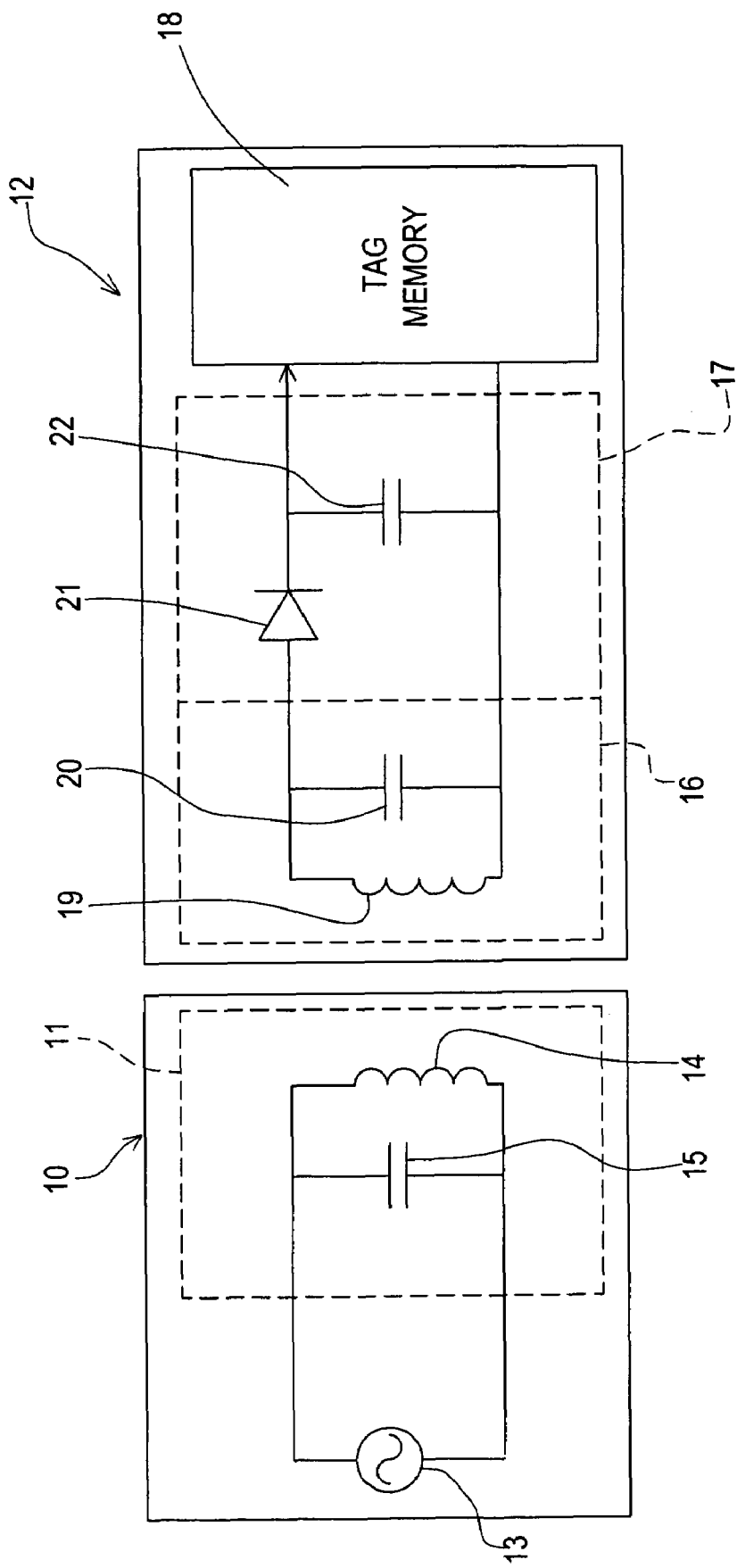
FIG. 1 is a circuit diagram of a known read/write device and tag.
Figure 2B:
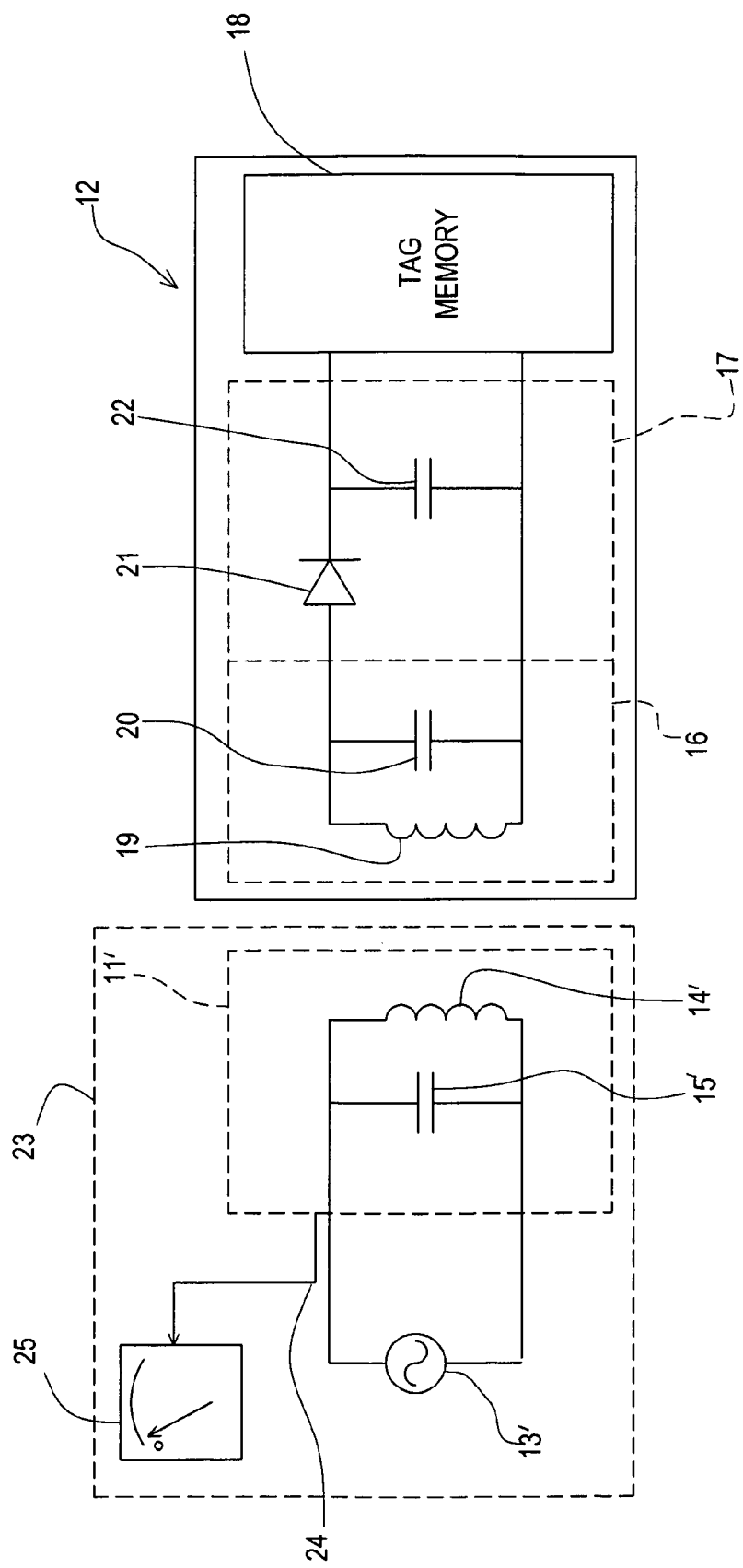
FIG. 2b is a diagrammatic illustration of a read/write device embodying the present invention in the presence of a tag.

Referring now to FIGS. 2a and 2b, a detector embodying the present invention is shown generally at 23. The detector 23 in like manner to the reader of FIG. 1 comprises a resonant circuit part 11' comprising a capacitor 13' and a inductor 14'. In this example, the inductor 14' comprises an antenna. Connected to the resonant circuit part 11' is a signal generator 13' operable to supply a signal at a desired frequency to the resonant circuit part 11'.

To monitor the power reflected by the resonant circuit part 11, a coupler 24 is provided connected to a power monitor 25. When no tag is within the vicinity of the inductive part 14', the signal generated by the frequency source 13' will be reflected by the resonant circuit part 11. A part of this reflected signal will be split off by the coupler 15 and directed to the power monitor 25.

A tag is shown at 12 identical to that of FIG. 1. The tag 12 simply comprises a tag resonant circuit part 16 and a rectifying circuit part 17 to supply power to a memory 18. The resonant circuit parts 11', 16 are tuned to have generally the same resonant frequency. When the tag 12 is sufficiently close to the inductor 14' such that there is inductive coupling between the resonant circuit parts 11', 16, the resonant circuit part 16 will draw power from the magnetic field of the inductor, and the resulting signal is rectified by the rectifying circuit part 17 to power the memory 18.

When the tag 12 is brought in the vicinity of the inductor 14' as shown in FIG. 2b the inductive coupling between the resonant circuit part 11' and the tag resonant circuit part 16 will draw power from the detector 23, causing a reduction in the power of the signal reflected by the resonant circuit part 11'. This fall will be detected by the power monitor 25 as shown diagrammatically in FIG. 2b. Thus, by detecting the fall in the power of the reflected signal, the presence of a tag may be inferred.

A detector as shown in FIGS. 2a and 2b may advantageously be incorporated in a read/write device operable to retrieve data from and/or write data to a tag.

Figure 3:
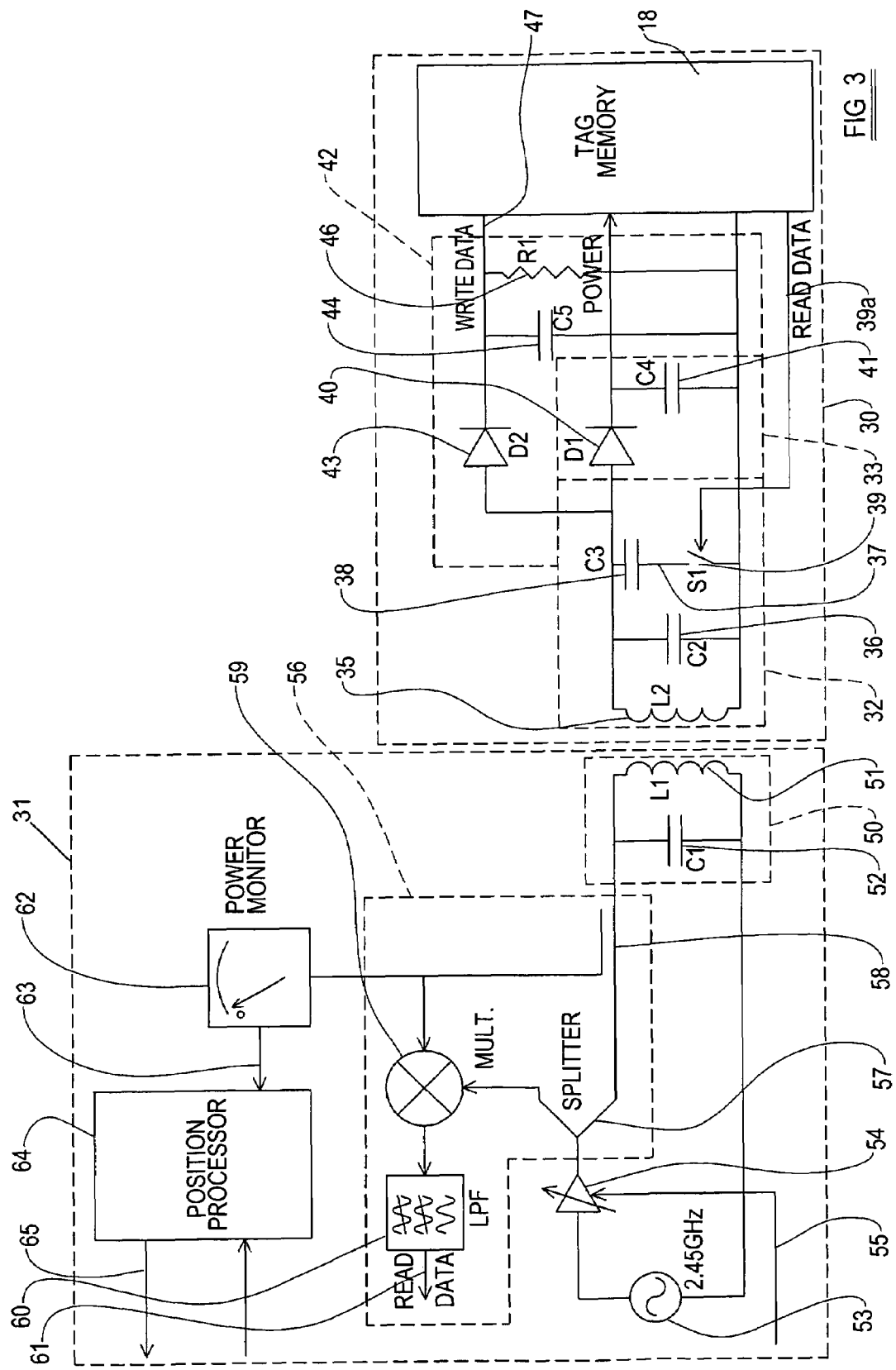
FIG. 3 is a diagrammatic illustration of a particular implementation of a read/write device and tag embodying the present invention.

Referring now to FIG. 3, a memory tag embodying the present invention is shown at 30 and a read/write device shown at 31. The tag 30 comprises a resonant circuit part 32 and a rectifying circuit part 33, together with a memory 18. The resonant circuit part 32 comprises an inductor L2 35 and a capacitor C2 36 connected in parallel in like manner to the tag 12 of FIG. 1, FIG. 2b. The resonant circuit part 32 further comprises a controllable capacitive element generally indicated at 37, in the example of FIG. 3 comprising a capacitor C3 38 and a switch S1 39 which is connected to a read data line 39a connected to the memory 36 to modulate the resonant frequency of the resonant circuit part 32. The rectifying part 33 comprises a diode D1 40 connected to the resonant circuit part 32 in a forward biased direction and a capacitor C4 41 connected in parallel with the components of the resonant circuit part 32. The rectifying circuit part 33 operates in like manner to the rectifying circuit part 17 of FIG. 1 as a half-wave rectifier to provide power to the memory 18. The tag 30 further comprises a write data circuit part 42. The write data circuit part 42 comprises a diode D2 43 connected in the forward bias direction to the output of the resonant circuit part 32, with a capacitor C5 44 and a resistor R1 46 connected in parallel with the components of the resonant circuit part 32. The write data circuit part 42 thus in this embodiment comprises a simple envelope detector which is responsive to the magnitude of the signal generated by the resonant circuit part 32, and provides a write data signal on a line 47 to the memory 18.

The read/write device 31 in like manner to the detector 23 comprises a resonant circuit part 50 which comprises an inductor L1 51 and a capacitor C1 54 connected in parallel. A frequency generator 53 is connected to the resonant circuit part 50. The read/write device 31 further comprises an amplitude modulator 54 which is controllable in response to data sent on a write data line 55. The amplitude modulator 54 controls the power of the signal from the frequency generator 53 to the resonant circuit part 50, and thus provides modulation of the amplitude of the power of the signal generated by the resonant circuit part 32 which can be detected by the right data circuit part 42 of the tag 30.

The read/write device 31 further comprises a demodulator, generally shown at 56. The demodulator 46 comprises a splitter 57 connected to the frequency generator 45 to split off a part of the signal to provide a reference signal. A coupler 58 is provided to split off a part of the reflected signal reflected back from the resonant circuit part 50. The reference signal and reflected signal are passed to a multiplier indicated at 59. The multiplier 59 multiplies the reflected signal and the reference signal and passes the output to a low pass filter 60. The low pass filter 60 passes a signal corresponding to the phase difference between the reference signal and the reflected signal to an output 61. By controlling the switch S1 39 of the tag 30 under control of the memory 34, the resonant frequency of resonant circuit part 32 can be modulated and hence the phase of the reflected signal reflected by the resonant circuit part 50 with respect to a reference signal can be modulated. This change of phase is detected by the demodulator 55, and so data can be read from the tag by the read/write device 31. By this method, data may be transmitted from the tag 30 whilst not significantly affecting the power drawn by the resonant circuit part 32.

A power monitor 62 is provided connected to the coupler 57 in like manner to the coupler 24 of FIG. 2a. Because, as described hereinbefore, the tag 30 is operable to provide a modulated signal to the read/write device without significantly varying the power drawn by the resonant circuit part 32, the amplitude of the reflected signal from the resonant circuit part 50 will be primarily dependent on the power drawn by the tag 30 and be independent of the modulation of the reflected signal by operation of switch S1. Thus, the power monitor 62 is operable to detect the presence of a tag 30 adjacent to the read/write device 31 by detecting a drop in the power in the signal reflected by the resonant circuit part 50. The power monitor may be implemented in a relatively simple fashion, for example by providing a simple rectifier similar to the rectifying circuit part 33 of the tag 30, to provide an output signal 62 comprising, in this example, a simple voltage. An output is provided to a position processor shown at 63, which in FIG. 3 is shown as part of the read/write device 31 which it is apparent may be provided on any other device or element as appropriate.

Figure 4:
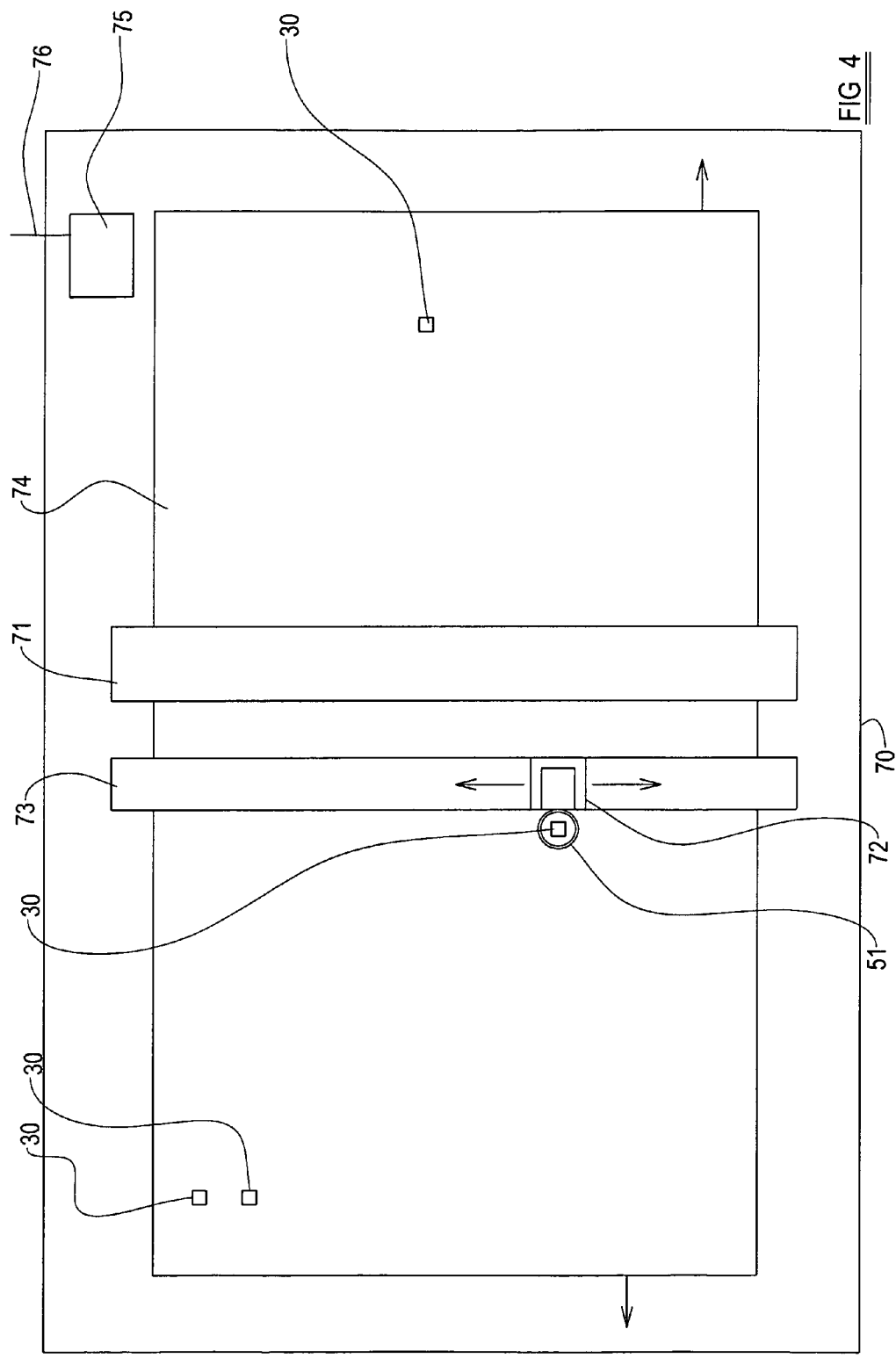
FIG. 4 is a diagrammatic illustration of a read/write system comprising a printer embodying the present invention.

The read/write device 31 of FIG. 3 may be used in an appropriate application as desired. For example, as shown with reference to FIG. 4, a printer is shown schematically at 70 provided with means to handle and print on a base medium for example a roller shown diagrammatically at 71 and a print head 72 movable on a track 73. The printer 70 is operable to receive a suitable flexible base medium, in this example a sheet of paper 74, provided with a plurality of tags 30 distributed over the paper 74. In this example, the print head 72 is provided with a read/write device 31, and the inductor 51 comprises a loop antenna projecting from the print head 72. The printer comprises a printer controller 75 provided with an external connection 76, for example to a computer to receive data to be printed. The printer controller 75 is operable to control the rollers 71 to feed the paper sheet 74, and also to move the print head 72 along the track 73 and instruct the print head 72 to print on the paper 34.

Figure 5:
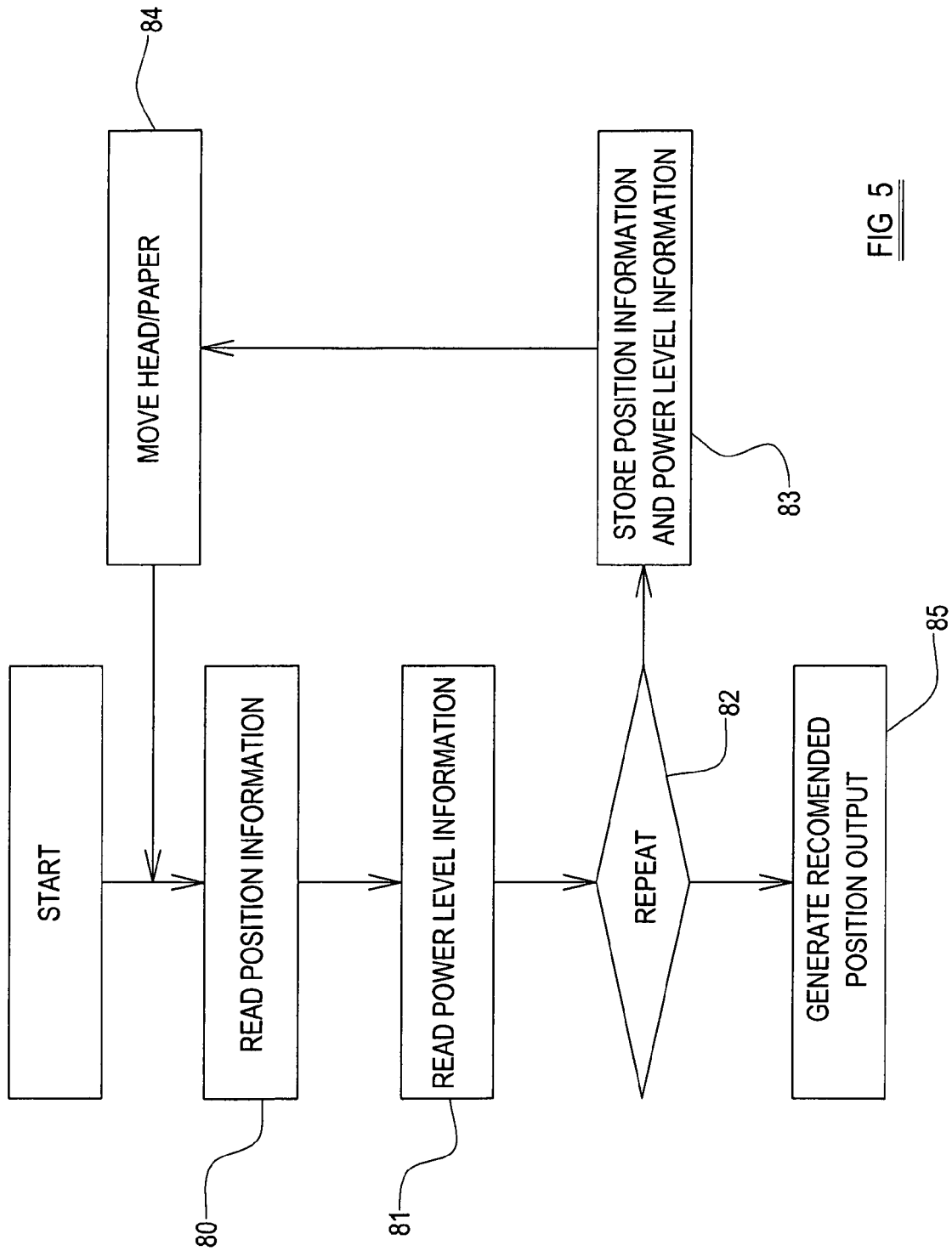
FIG. 5 is a flow diagram illustrating a method embodying the present invention.

In this embodiment, the printer controller 75 will be aware of the position of the paper sheet 74 by virtue of operation of the roller assembly 71 and also knows the position of the print head 72 on the track 73. This information is provided to the position processor 64, which will therefore know the position of the antenna 51 relative to the sheet of paper 74, and will also receive the output signal 63 from the power monitor 62 at that position. As seen in FIG. 5, the position processor will then be able to perform the method of, at step 80, receiving the position information, in this example the print head position 32 and also the position of the paper. At step 81, the processor 63 will receive the power level information, that is the power signal 63 received from the position monitor 62. As shown at step 82, the position processor can repeat the process as necessary, storing information as shown at step 83. The print head 72 or paper 74 may then be moved at step 84, for example by the position processor sending an output on line 65 to the printing controller 75 or otherwise as desired. When the position processor 64 has sufficient information, it may generate a recommended position output indicating an appropriate position of a tag 30.

The method of FIG. 5 may be implemented as desired, further to provide a good as coupling as possible between the read/write device 31 and a tag 30, or to provide a simple criteria as desired or otherwise. For example, it will be apparent that by performing the steps of the method of FIG. 5 repeatedly, moving the print head and paper 84 as necessary, a two-dimensional "map" of the sheet of paper 74 may be built of where the position of tags 30 is indicated by minima in the power of the signal reflected from the resonant circuit part 50. Since the position of each of the minima corresponding to a tag will be known, by sending the appropriate instructions to the printer controller 75 the roller 71 and the print head 72 may be moved to position the antenna 51 directly over a tag 30 as desired. In a more simple implementation, the position processor 63 will simply detect when the power of the reflected signal falls below a given level, indicating that the tag 30 is sufficiently close to the antenna 51 to provide a sufficient inductive coupling, without necessarily taking further steps to identify the position of the tag 30. This might be applicable for circumstances where the print head 72 is repeatedly scanned across the paper 74 is successive lines, and data is written to be read from the tag 30 on each successive pass during the period when the reflected power signal is below a threshold. In this case, the step of storing the position and power information may be omitted, or the position and power information may be stored to allow the tag 30 to be relocated if desired.

Figure 6:
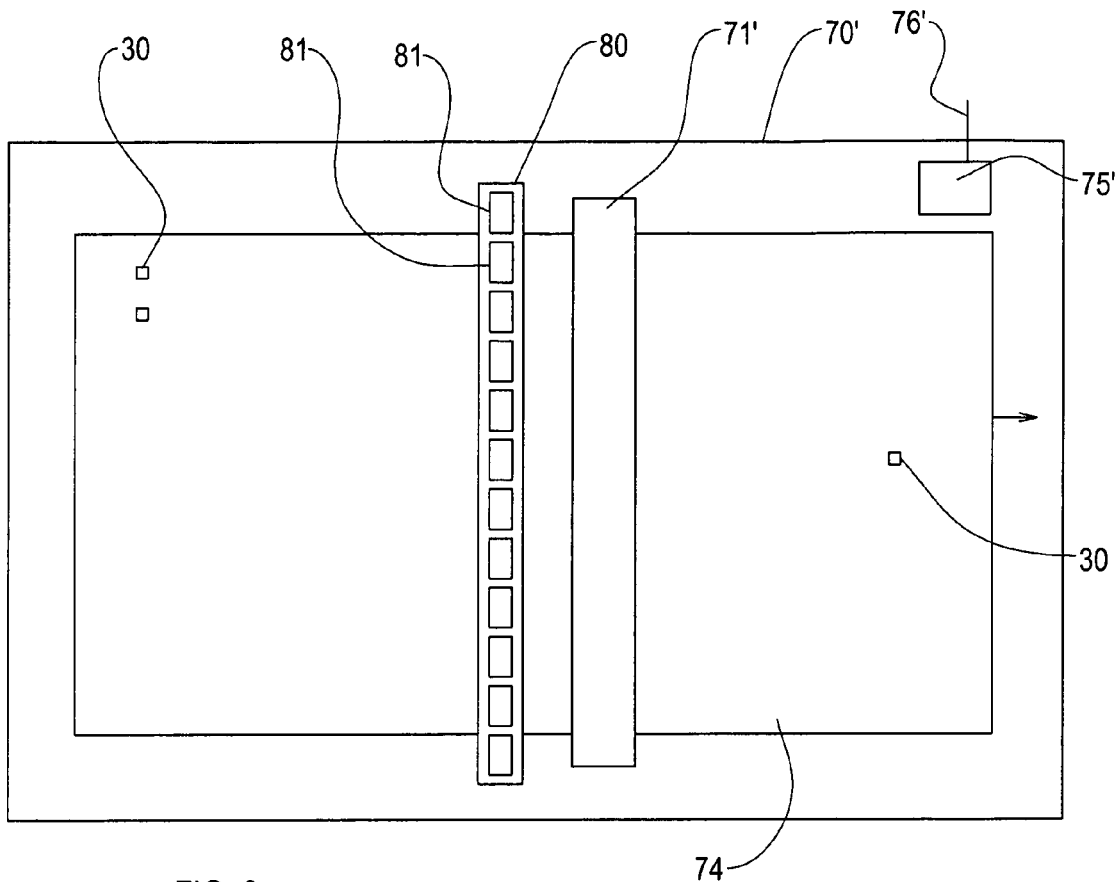
FIG. 6 is a diagrammatic illustration of a further read/write system embodying the present invention.

As shown in FIG. 6, an alternative read/write device 70' comprising a printer is shown comprising an arm 80 provided with a plurality of detectors 81 similar to the detector 23 each operable to scan a part of the base medium, in this example paper 74' as passes under the plurality of detectors 81 and provide an output accordingly to the printer controller 75'. This embodiment is particularly suitable for use in a read/write device such as a printer which does not have a scanning print head.

Figure 7:
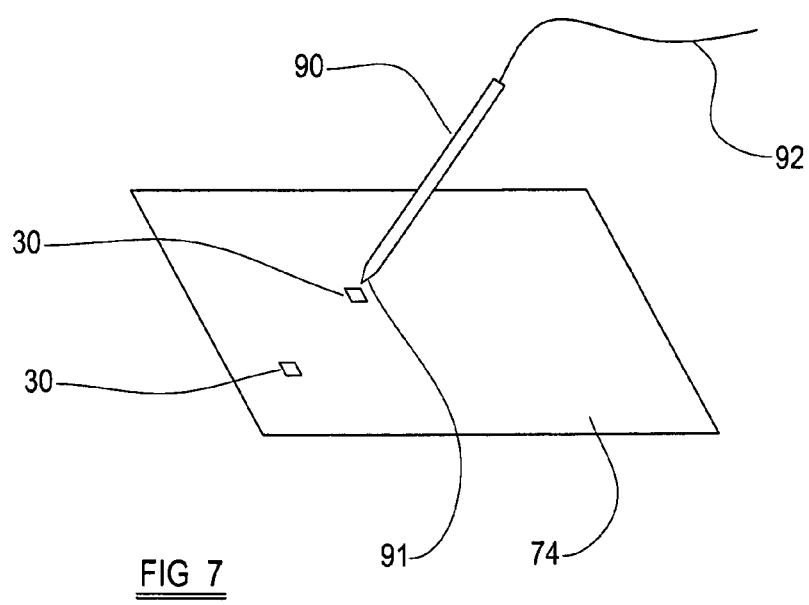
FIG. 7 is a diagrammatic illustration of a further read/write system embodying the present invention.

In a yet further read/write system embodying the invention, a read/write system comprising a wand 90 is shown in FIG. 7, which may be manually positioned to attach a tag 30 on a sheet of paper 74, for example by a user touching the wand 90 to a printed mark. The wand 90 may comprise a simple detector as shown in FIGS. 2a and 2b, with a connection 92, for example for connection to a computer, or may be provided with some or all of the functionality of the read/write device 31 and its own internal memory to be able to operate without any such connection 92.

The wand 90 is provided with an antenna such as the antenna 51 of FIG. 3, at its tip 91.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A printer operable to print on a base medium provided with at least one memory tag, the printer comprising a detector for detecting the presence of a memory tag, the detector comprising a radio frequency source operable to generate a radio frequency signal and a detector resonant circuit part connected to the radio frequency source, the detector resonant circuit part comprising an antenna, the detector further comprising a power monitor responsive to the power of a reflected signal returned from the detector resonant circuit part, the power monitor being operable to generate an output in response to the power of the reflected signal, wherein a decrease in the power of the reflected signal indicates the presence of a tag in the vicinity of the antenna.

2. A printer according to claim 1 wherein the printer is operable to read data from and/or write data to the tag in response to the power monitor output.

3. A method for detecting the presence of a tag, comprising transmitting a signal to a resonant circuit part comprising an antenna, monitoring the power of a reflected signal reflected from the resonant circuit part, wherein a decrease in the power of the reflected signal indicates the presence of a tag in the vicinity of the antenna.

* * * * *

UNITED STATES PATENT AND TRADEMARK OFFICE
CERTIFICATE OF CORRECTION

PATENT NO. : 7,646,303 B2
APPLICATION NO. : 11/598195
DATED : January 12, 2010
INVENTOR(S) : John Deryk Waters et al.

Page 1 of 1

It is certified that error appears in the above-identified patent and that said Letters Patent is hereby corrected as shown below:

On the face page, below "Item (63)", insert:

-- (30) Foreign Application Priority Data
   Nov. 21, 2002   (GB) ................ 0227196.3 --.

Signed and Sealed this
Twenty-fourth Day of July, 2012

David J. Kappos
*Director of the United States Patent and Trademark Office*